(12) United States Patent
Liu et al.

(10) Patent No.: US 12,094,211 B2
(45) Date of Patent: Sep. 17, 2024

(54) SURVEILLANCE REGION IDENTIFYING METHOD AND SURVEILLANCE APPARATUS

(71) Applicant: VIVOTEK INC., New Taipei (TW)

(72) Inventors: Cheng-Chieh Liu, New Taipei (TW); Shaw-Pin Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 443 days.

(21) Appl. No.: 17/535,677

(22) Filed: Nov. 25, 2021

(65) Prior Publication Data

US 2022/0172480 A1    Jun. 2, 2022

(30) Foreign Application Priority Data

Dec. 2, 2020   (TW) .................................. 109142417

(51) Int. Cl.
*G06V 20/52* (2022.01)
*G06T 7/246* (2017.01)
(Continued)

(52) U.S. Cl.
CPC .............. *G06V 20/52* (2022.01); *G06T 7/248* (2017.01); *G06V 10/25* (2022.01); *G06V 10/751* (2022.01);
(Continued)

(58) Field of Classification Search
None
See application file for complete search history.

(56) References Cited

U.S. PATENT DOCUMENTS

| 2012/0105615 A1* | 5/2012 | Davidich | G06V 20/53 |
| | | | 348/E7.085 |
| 2013/0208124 A1* | 8/2013 | Boghossian | H04N 7/181 |
| | | | 382/103 |

(Continued)

FOREIGN PATENT DOCUMENTS

| CN | 107133269 A | 9/2017 |
| TW | 201539385 A | 10/2015 |
| TW | 202006673 A | 2/2020 |

OTHER PUBLICATIONS

M. Nedrich and J. W. Davis, "Detecting behavioral zones in local and global camera views," Machine Vision and Applications, vol. 24, No. 3, pp. 579-605, Mar. 2012. doi:10.1007/s00138-012-0418-4 (Year: 2012).*

(Continued)

*Primary Examiner* — Vu Le
*Assistant Examiner* — Charles C L Penny
(74) *Attorney, Agent, or Firm* — Winston Hsu

(57) ABSTRACT

A surveillance region identifying method is used to analyze a region feature of a surveillance region covered by a surveillance apparatus. The surveillance region identifying method includes analyzing all track information within a series of images acquired by the surveillance apparatus to acquire an appearing point and a disappearing point of each track information, utilizing cluster analysis to define a main appearing point cluster of the appearing points, computing enter vectors of all appearing points inside the main appearing point cluster, and analyzing vector angles of all enter vectors of the main appearing point cluster to define an entrance of the surveillance region.

18 Claims, 5 Drawing Sheets

(51) Int. Cl.
*G06V 10/25* (2022.01)
*G06V 10/75* (2022.01)

(52) U.S. Cl.
CPC ............... *G06T 2207/20021* (2013.01); *G06T 2207/30241* (2013.01)

(56) References Cited

U.S. PATENT DOCUMENTS

| | | | | |
|---|---|---|---|---|
| 2014/0112546 | A1* | 4/2014 | Lee | G08B 13/19676 382/107 |
| 2014/0362230 | A1* | 12/2014 | Bulan | G06V 10/255 348/169 |
| 2017/0278254 | A1* | 9/2017 | Ikeda | G06T 7/11 |
| 2017/0286781 | A1* | 10/2017 | Xu | G06N 20/00 |

OTHER PUBLICATIONS

D. P. Dogra, R. D. Reddy, K. S. Subramanyam, A. Ahmed, and H. Bhaskar, "Scene representation and anomalous activity detection using Weighted Region Association graph," Proceedings of the 10th International Conference on Computer Vision Theory and Applications, 2015. doi:10.5220/0005305101040112 (Year: 2015).*

D. P. Dogra, A. Ahmed, and H. Bhaskar, "Interest area localization using trajectory analysis in surveillance scenes," Proceedings of the 10th International Conference on Computer Vision Theory and Applications, 2015. doi:10.5220/0005334704780485 (Year: 2015 ).*

M. Shoaib, M. Y. Yang, B. Rosenhahn, and J. Ostermann, "Estimating layout of cluttered indoor scenes using trajectory-based priors," Image and Vision Computing, vol. 32, No. 11, pp. 870-883, Nov. 2014. doi:10.1016/j.imavis.2014.07.003 (Year: 2014).*

X. Lu, C. Wang, N. Karamzadeh, A. Croitoru, and A. Stefanidis, "Deriving implicit indoor scene structure with path analysis," Proceedings of the 3rd ACM SIGSPATIAL International Workshop on Indoor Spatial Awareness, Nov. 2011. doi:10.1145/2077357.2077367 (Year: 2011).*

Nedrich, M., Davis, J.W. Detecting behavioral zones in local and global camera views. Machine Vision and Applications 24, 579-605 (2013). Doi: 10.1007/s00138-012-0418-4 (Year: 2013).*

* cited by examiner

SURVEILLANCE REGION IDENTIFYING METHOD AND SURVEILLANCE APPARATUS

BACKGROUND OF THE INVENTION

1. Field of the Invention

The present invention relates to a surveillance region identifying method and a surveillance apparatus, and more particularly, to a surveillance region identifying method of automatically analyzing an entrance and a regional shape of a surveillance region and a related surveillance apparatus.

2. Description of the Prior Art

A surveillance apparatus can be installed in an open space or an enclosed space. The surveillance region of the surveillance apparatus is defined as all area vestured by a detection signal of the surveillance apparatus when the surveillance apparatus is installed in the open space. If the surveillance apparatus is installed in the enclosed space, the surveillance region of the surveillance apparatus is limited by partition walls of the enclosed space. The conventional surveillance apparatus cannot identify existence of the partition walls; a user has to manually draw the region of interest within a surveillance image, and the conventional surveillance apparatus effectively identifies a moving trace of the moving object inside the region of interest for counting and analysis, and further identifies some objects that do not belong to an effective target and then eliminates the moving trace of the ineffective object. Thus, design of a surveillance region identifying method and a related surveillance apparatus capable of automatically detecting a range, a shape and an entrance of the surveillance region for preferred tracking accuracy is an important issue in the surveillance industry.

SUMMARY OF THE INVENTION

The present invention provides a surveillance region identifying method of automatically analyzing an entrance and a regional shape of a surveillance region and a related surveillance apparatus for solving above drawbacks.

According to the claimed invention, a surveillance region identifying method is used to analyze a region feature of a surveillance region covered by a surveillance apparatus. The surveillance region identifying method includes analyzing all track information within a series of surveillance images acquired by the surveillance apparatus to acquire an appearing point of each track information, utilizing cluster analysis to define a main appearing point cluster of appearing points of all the track information, computing enter vectors of a plurality of appearing points inside the main appearing point cluster, and analyzing vector angles of a plurality of enter vectors of the main appearing point cluster to define an entrance of the surveillance region in accordance with an analysis result.

According to the claimed invention, a surveillance apparatus includes an image receiver and an operation processor. The image receiver is adapted to receive a series of surveillance images. The operation processor is electrically connected to the image receiver. The operation processor is adapted to analyze all track information within the series of surveillance images acquired by the surveillance apparatus to acquire an appearing point of each track information, utilize cluster analysis to define a main appearing point cluster of appearing points of all the track information, compute enter vectors of a plurality of appearing points inside the main appearing point cluster, and analyze vector angles of a plurality of enter vectors of the main appearing point cluster to define an entrance of a surveillance region covered by the surveillance apparatus in accordance with an analysis result.

The surveillance region identifying method and the surveillance apparatus of the present invention can automatically increase a collection period of the track information when the quantity of the track information does not conform to the predefined quantity threshold, so as to acquire the correct region feature of the surveillance region; further, one predefined time cycle can be set, and the present invention can continuously collect the track information in the predefined time cycle and then analyze the collected track information again when the predefined time cycle is expired, so as to regularly detect whether the region feature of the surveillance region is changed, for determining whether to update the entrance and/or the shape of the surveillance region. The surveillance region identifying method and the related surveillance apparatus of the present invention do no need manual drawing of the region of interest. The present invention can collect the motion behavior and the moving trace of large numbers of the objects to select the effective track information, and automatically compute the correct entrance and the correct shape of the surveillance region in accordance with the effective track information, to provide advantages of inexpensive cost, convenient operation and an automatic updating function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
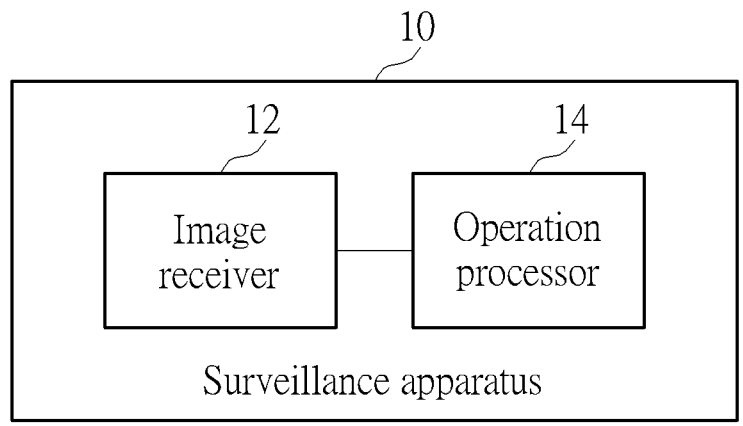
FIG. 1 is a functional block diagram of a surveillance apparatus according to an embodiment of the present invention.

Please refer to FIG. 1. FIG. 1 is a functional block diagram of a surveillance apparatus 10 according to an embodiment of the present invention. The surveillance apparatus 10 can be disposed on the ceiling or the wall in an inner space, and used to detect a movement of an object. The inner space can be interpreted as a surveillance region of the surveillance apparatus 10. The surveillance apparatus 10 can include an image receiver 12 and an operation processor 14. The image receiver 12 can receive a series of surveillance images. The image receiver 12 can be an image sensor, millimeter radar, or any optical sensor capable of acquiring the surveillance image relevant to the surveillance region. Application of the image receiver 12 is not limited to the above-mentioned embodiments, and depends on an actual demand. The operation processor 14 can be electrically connected to the image receiver 12 in a wire manner or in a wireless manner. The operation processor 14 can analyze a motion behavior and a moving trace of one or some objects within the series of surveillance images, so as to identify a region feature of the surveillance region covered by the surveillance apparatus 10. The region feature can be an entrance and a shape of the surveillance region, which depends on the actual demand.

Figure 2:
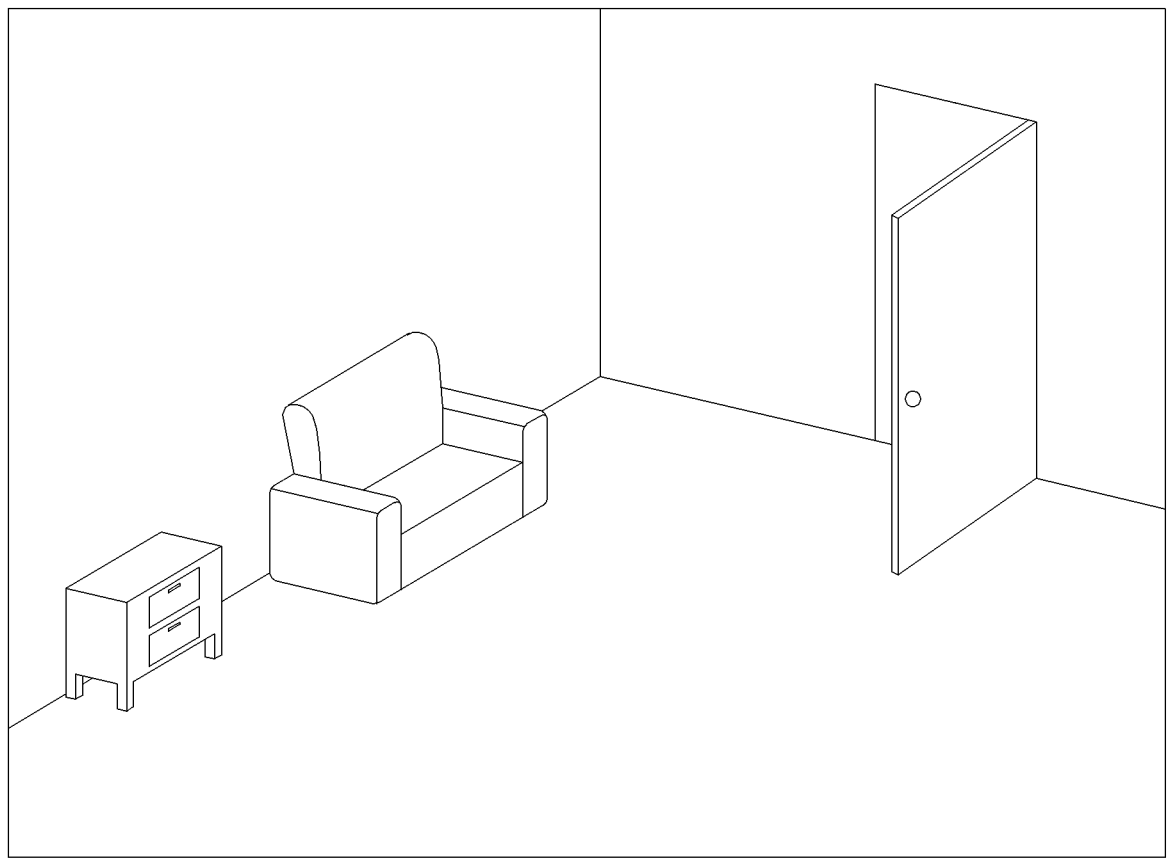
FIG. 2 is a diagram of the surveillance image acquired by the surveillance apparatus according to the embodiment of the present invention.
Figure 3:
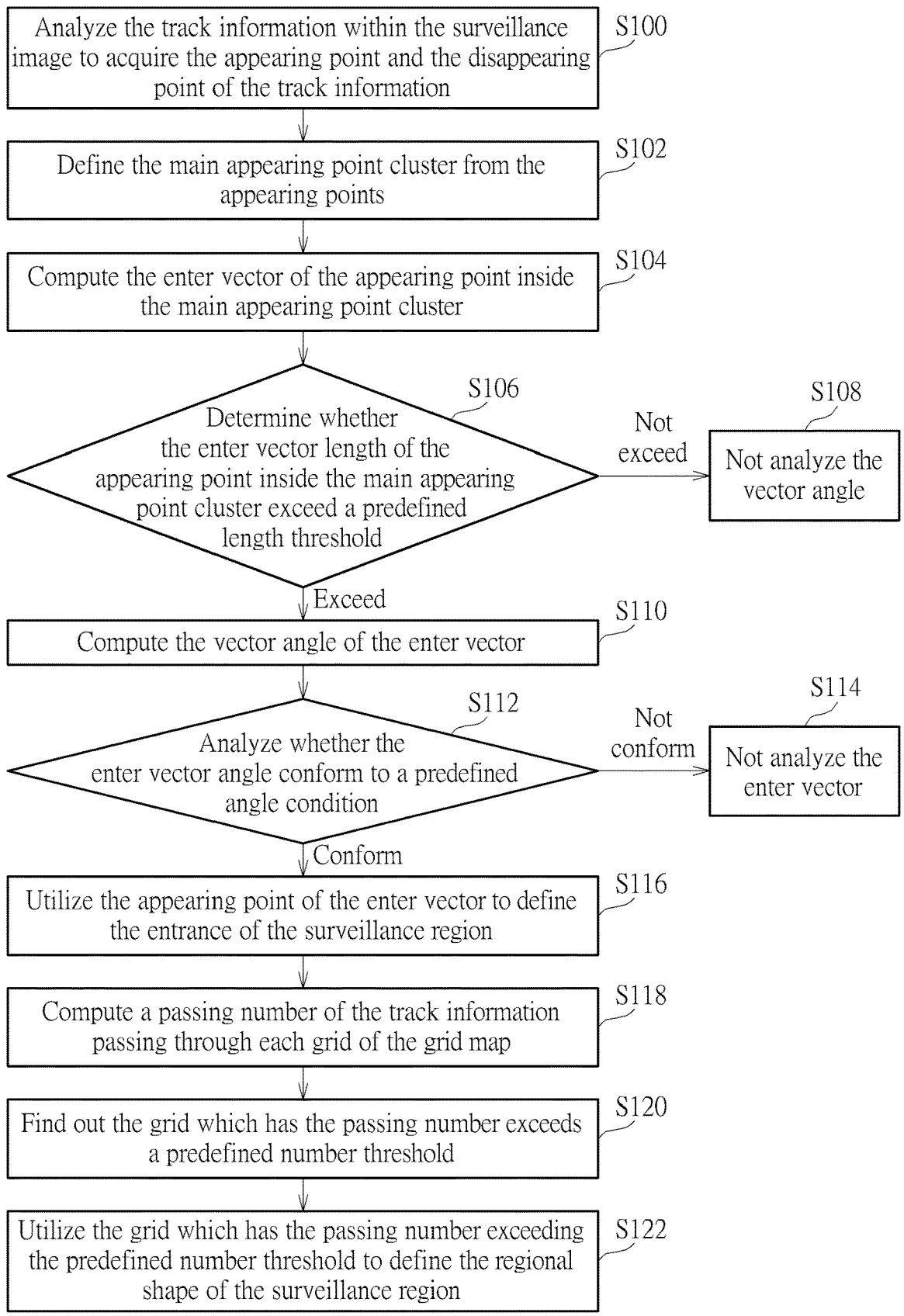
FIG. 3 is a flow chart of the surveillance region identifying method according to the embodiment of the present invention.
Figure 4:
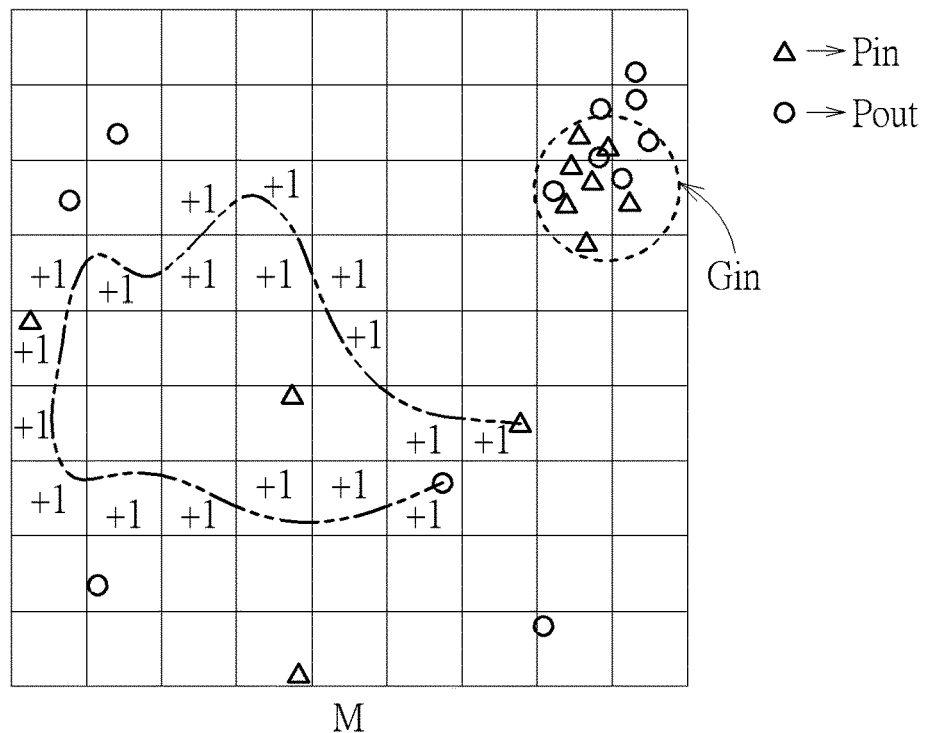
FIG. 4 is a diagram of a grid map transformed by the surveillance image according to the embodiment of the present invention.
Figure 5:
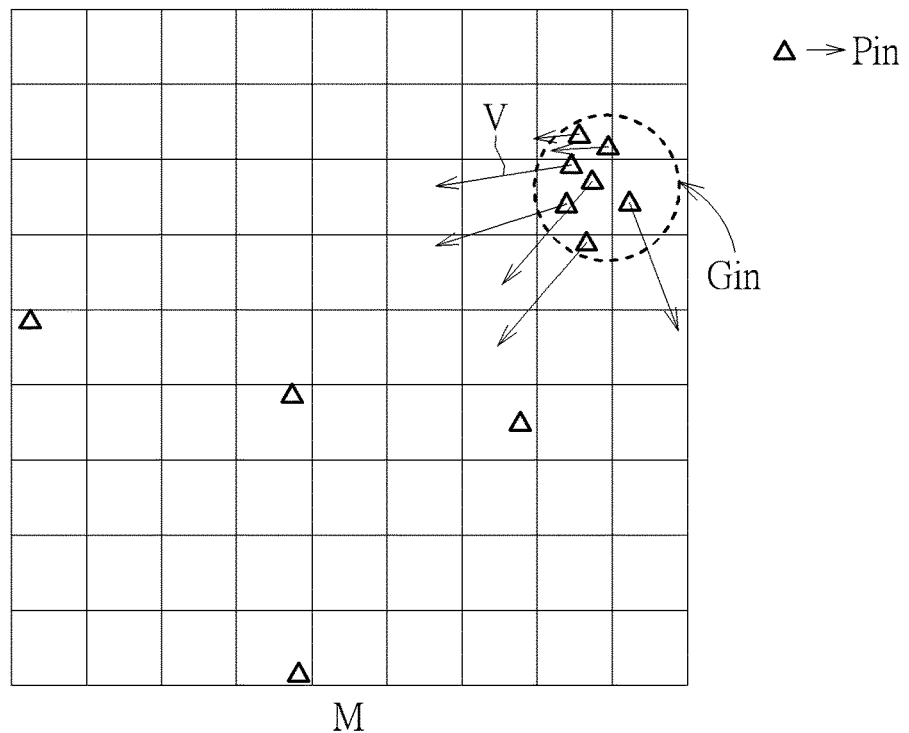
FIG. 5 to FIG. 7 are diagrams of the grid map simplified by several steps according to the embodiment of the present invention.
Figure 6:
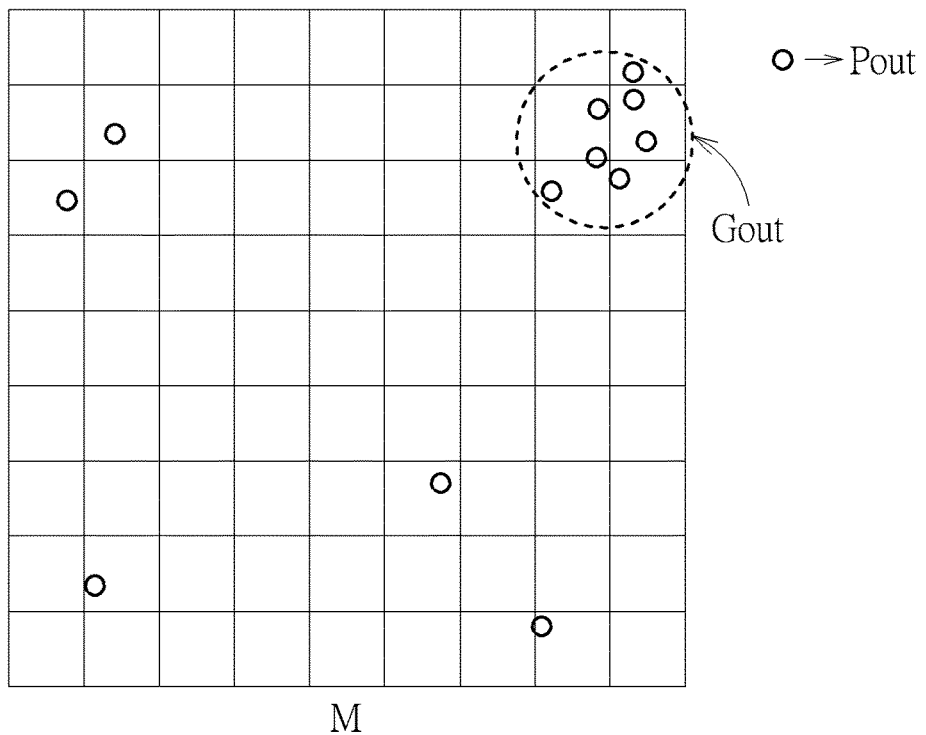
Figure 7:
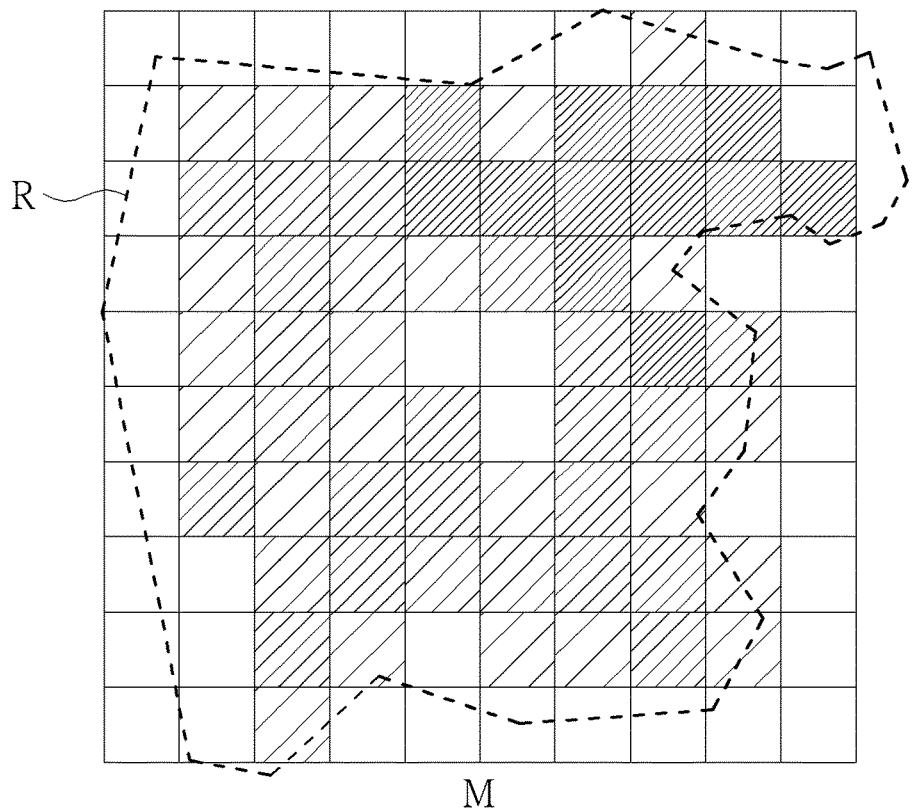
Figure 8:
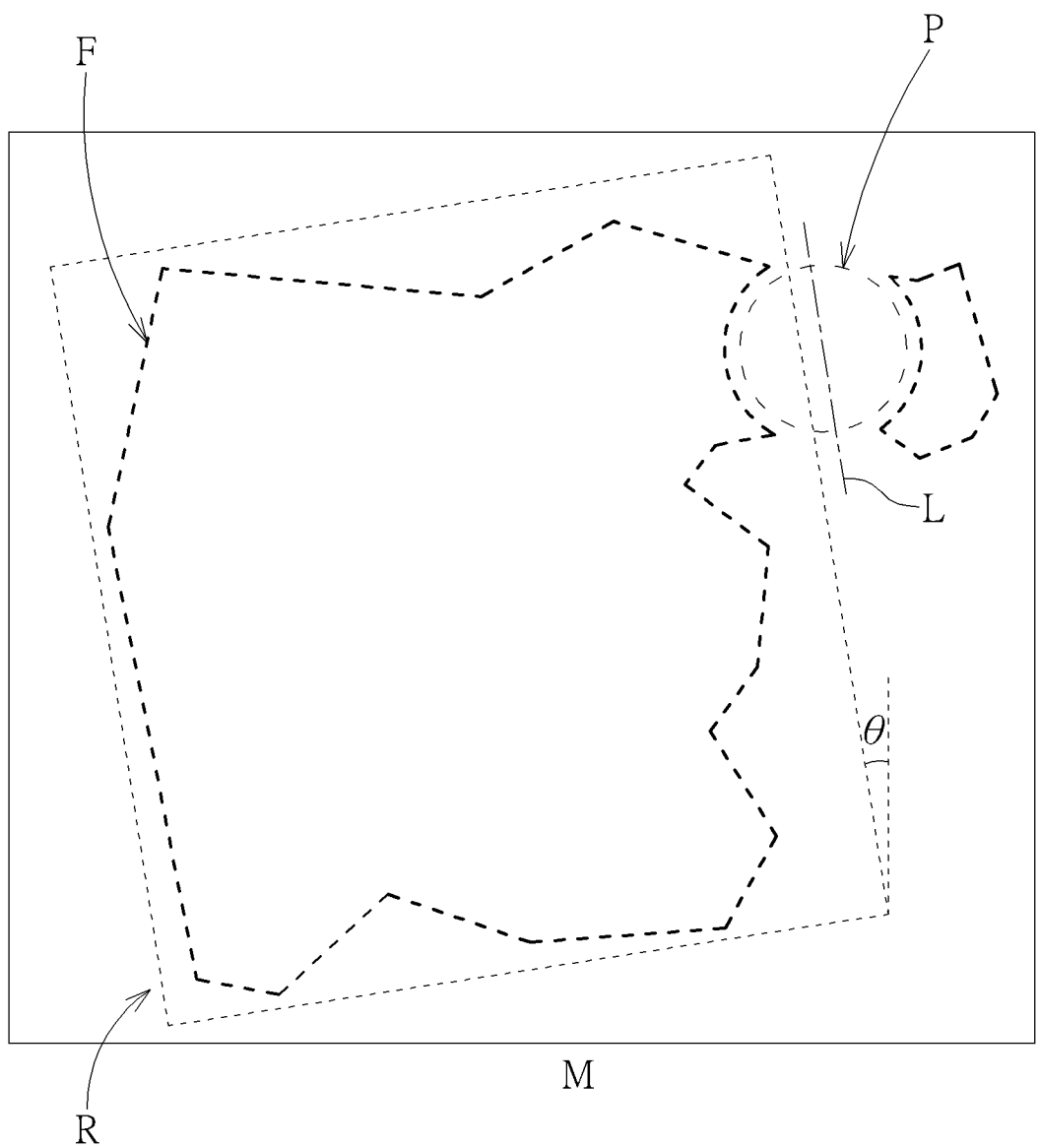
FIG. 8 is a diagram of the surveillance region according to the embodiment of the present invention.

Please refer to FIG. 2 to FIG. 8. FIG. 2 is a diagram of the surveillance image I acquired by the surveillance apparatus 10 according to the embodiment of the present invention. FIG. 3 is a flow chart of the surveillance region identifying method according to the embodiment of the present invention. FIG. 4 is a diagram of a grid map M transformed by the surveillance image I according to the embodiment of the present invention. FIG. 5 to FIG. 7 are diagrams of the grid map M simplified by several steps according to the embodiment of the present invention. FIG. 8 is a diagram of the surveillance region according to the embodiment of the present invention. The surveillance region identifying method illustrated in FIG. 3 can be suitable for the surveillance apparatus 10 shown in FIG. 1.

First, step S100 can be executed to analyze track information of all objects within the series of surveillance images I acquired in a specific period, for acquiring an appearing point Pin and a disappearing point Pout of each of the foresaid track information. In one possible embodiment, the surveillance image I may be object data inside the surveillance region acquired by any optical sensor, such as an image frame captured by an image sensor, a frame data sensed by the millimeter radar, or the object data sensed by any kinds of optical sensor. The track information can be analyzed to acquire the appearing point Pin and the disappearing point Pout if a quantity of the track information conforms to a quantity threshold. A range of the grid map M can correspond to a size or dimensions of the series of surveillance images I. The appearing point Pin and the disappearing point Pout can be marked on the grid map M. In the grid map M, the appearing point Pin can be indicated by a triangular form, and the disappearing point Pout can be indicated by a circular form, which depends on the actual demand.

In step S100, the surveillance region identifying method can optionally acquire a continued period of each of the track information. If the continued period of one track information is short and is smaller than or equal to a predefined time threshold, the object relevant to the track information is temporarily stayed inside the surveillance region, and can be defined as an ineffective trace and be eliminated. If the continued period of one track information is greater than the predefined time threshold, the object relevant to the track information is continuously stayed and moved inside the surveillance region, so that the track information of the object may be spread all over the surveillance region and can be defined as the effective track information; the effective appearing point Pin and the effective disappearing point Pout can be extracted from the effective track information.

In addition, the surveillance apparatus 10 may immediately detect existence of the object when the object is just moved into the inner space, but still has to confirm whether the object belongs to a detective target and then be able to determine whether the track information of the object can be used to identify the region feature of the surveillance region. Thus, the surveillance region identifying method can optionally determine whether each object inside the surveillance image I conforms to a predefined identification condition. If the object inside the surveillance image I does not conform to the predefined identification condition, the object is not human, such as a machine or a vehicle, and the track information of the non-human object cannot be used in the following surveillance region identifying method. If the object inside the surveillance image I conforms to the predefined identification condition, the object is human, and the surveillance region identifying method of the present invention can be continued to acquire an immediate coordinates of the object at a point of time that the object is determined as conforming to the predefined identification condition, and then the immediate coordinates can be defined as the appearing point Pin of the track information relevant to the object.

For example, the first surveillance image captured by the surveillance apparatus 10 may detect one object moved into the inner space, and the coordinates of the object in the first surveillance image cannot be defined as the appearing point of the track information because the object is not yet confirmed as human; the surveillance region identifying method may spend a small analysis period to confirm the detected object is human, such as the detected object in the fifth surveillance image of the series of surveillance images, and the surveillance region identifying method can acquire and define the immediate coordinates of the object in the fifth surveillance image as the appearing point Pin of the track information relevant to the object. A length of the foresaid analysis period may be set in accordance with a skill level of human identification technology applied by the surveillance region identifying method in the present invention. The length of the foresaid analysis period may be short. The human identification technology can complete a human identification result when the object is just moved into the inner space but not arrived at the entrance of the surveillance region.

In a phase of step S100, the entrance and the shape of the surveillance region are unknown; the object is the moving person, and the track information is a moving path of the person. Generally, the appearing points Pin of all track information may be gathered at a small range around the entrance inside the surveillance region, and the disappearing points Pout may be scattered toward all directions out of the entrance. Therefore, the surveillance region identifying method of the present invention can preferably utilize the appearing point Pin to identify the entrance of the surveillance region, and the disappearing point Pout is auxiliary to inspect correctness of the entrance identified by the appearing point Pin.

Then, step S102 can be executed to define a main appearing point cluster Gin from the effective appearing points Pin via cluster analysis, and other effective appearing points Pin not belonging to the main appearing point cluster Gin can be defined as a sub appearing point cluster (which is not shown in the figures). As shown in FIG. 4, most of the appearing points Pin can be gathered into the specific range for defining position of the main appearing point cluster Gin; in the meantime, the specific range of the main appearing point cluster Gin may be the entrance of the surveillance region, and can be confirmed by following steps. The sub appearing point cluster contains a small number of the appearing points Pin distributed over other position inside the surveillance region, and may be noise of the track information, so that the appearing points Pin of the sub appearing point cluster cannot be used to identify the region feature of the surveillance region.

Then, step S104 can be executed to compute enter vectors V of the appearing points Pin inside the main appearing point cluster Gin. The surveillance region identifying method can acquire position change of the appearing point Pin of each track information after a predefine time period; for example, coordinates of the appearing point Pin after three seconds can be defined as the position change, and the predefine time period equals three seconds. Thus, the surveillance region identifying method can utilize the appearing point Pin and the position change to generate the enter vector V relevant to the appearing point Pin. The present invention can decide whether the track information actually passes through the entrance of the surveillance region via the enter vector V.

Then, steps S106, S108 and S110 can be executed to determine whether vector lengths of the enter vectors V of all the appearing points Pin inside the main appearing point cluster Gin exceed a predefined length threshold. If the vector length does not exceed the predefined length threshold, the enter vector V relevant to the foresaid vector length cannot be used in following vector angle analysis. If the vector length exceeds the predefined length threshold, a vector angle of the enter vector V relevant to the foresaid vector length can be computed. As shown in FIG. 5, most of the appearing points Pin inside the main appearing point cluster Gin can have the large enter vector V, and the enter vectors V of two appearing points Pin can apparently have the short vector lengths; therefore, the surveillance region identifying method may decide the track information relevant to the two appearing points Pin are hovered around and does not actually pass through the entrance of the surveillance region. The present invention can use the enter vector V with the longer vector length for execution of the vector angle analysis.

Then, steps S112, S114 and S116 can be executed to analyze whether the vector angles of the enter vectors V conform to a predefined angle condition. If the vector angle does not conform to the predefined angle condition, the enter vector V relevant to the foresaid vector angle cannot be used in the following vector angle analysis. If the vector angle conforms to the predefined angle condition, the appearing point Pin of the enter vector V relevant to the foresaid vector angle can be used to define the entrance of the surveillance region. As shown in FIG. 5, the enter vectors V of most of the appearing points Pin inside the main appearing point cluster Gin can point toward the left, and the enter vector V of one appearing point Pin can point toward the right, so that the surveillance region identifying method can determine that the track information corresponding to the appearing point Pin with the enter vector V pointing toward the right does not pass through the entrance of the surveillance region. The present invention can utilize the appearing point Pin relevant to the effective enter vector V that has the vector angle conforming to the predefined angle condition (such as pointing toward the left) to define the entrance of the surveillance region.

In step S116, the surveillance region identifying method can compute a geometric center and a specific geometric pattern P of the appearing points Pin relevant to the enter vectors V, and then utilize the specific geometric pattern P to define a boundary L of the entrance. For example, the geometric center may be a mass center or a gravity center of the appearing points Pin, and the specific geometric pattern P may be a circular form or a polygonal form. The boundary L of the entrance can be a central line or a lateral line of the specific geometric pattern P, as shown in FIG. 8. The shape of the geometric pattern P and position of the entrance boundary L are not limited to the above-mentioned embodiments, which depend on a design demand.

When the entrance and the boundary of the surveillance region are confirmed, the surveillance region identifying method can further utilize cluster analysis to define a main disappearing point cluster Gout from the effective disappearing points Pout, as shown in FIG. 6, and other appearing points Pin which do not belong to the main disappearing point cluster Gout can be classified as a sub appearing point cluster (which is not shown in the figures). The surveillance region identifying method can utilize the disappearing points Pout of the main disappearing point cluster Gout to acquire related disappeared vectors, vector angles of the disappeared vectors, and vector lengths of the disappeared vectors; then, the ineffective disappearing points Pout can be eliminated, and a gathered range of the effective disappearing points Pout can be defined as the entrance of the surveillance region. The surveillance region identifying method of the present invention can compare the entrance defined by the disappearing point Pout with the entrance defined by the appearing point Pin. If the entrance defined by the disappearing point Pout conforms to the entrance defined by the appearing point Pin, the entrance of the surveillance region can be correctly identified; if the entrance defined by the disappearing point Pout does not conform to the entrance defined by the appearing point Pin, the above-mentioned steps can be repeated to recollect the track information and to further find out the correct entrance of the surveillance region.

Then, step S118 can be executed to compute a passing number of the effective track information passing through each grid of the grid map M. The surveillance region identifying method can increase the passing number of one grid when the track information is appeared in the foresaid grid for a start or once again; if the track information is ceased at one grid, and the passing number of the foresaid grid is not increased. Therefore, each grid of the grid map M can record the passing number of all the effective track information, as shown in FIG. 4. As shown in FIG. 7, the grid map M in FIG. 7 can be transformed by the grid map M in FIG. 4; the grids that have the larger passing number are marked by dense lines, and other grids that have smaller passing number are marked by sparse lines. Then, steps S120 and S122 can be executed to find out the grid which has the passing number exceeds a predefined number threshold, and the girds with the passing number exceeding the predefined number threshold can be used to define the regional shape of the surveillance region, such as a dotted frame F.

As shown in FIG. 7 and FIG. 8, a heat area of the grid may be located around the entrance of the surveillance region, and can have the larger passing number; however, the heat area of the grid generated by the grid map M may be extended out of the entrance of the surveillance region, such as space outside the door shown in FIG. 2, so that the surveillance region identifying method of the present invention can optionally mark at least one of the geometric pattern P and the boundary L acquired in step S116 over the regional shape of the surveillance region, and an extra region excluded by the geometric pattern P and the boundary L can be removed, so as to form an effective range of the surveillance region, as shown in FIG. 8. It should be mentioned that the surveillance region identifying method of the present invention can further draw a smallest rectangular form R in accordance with the effective range of the surveillance region; the smallest rectangular form R can have a rotary angle θ for being rotated to a straight position, which means an angle of a boundary of the smallest rectangular form R relative to a vertical reference axis or a horizontal reference axis, and the rotary angle θ can be defined as an installation direction of the surveillance apparatus 10. The surveillance apparatus 10 can be rotated in accordance with the rotary angle θ for straightening the surveillance region of the surveillance apparatus 10 toward the inner space.

In conclusion, the surveillance region identifying method and the surveillance apparatus of the present invention can automatically increase a collection period of the track information when the quantity of the track information does not conform to the predefined quantity threshold, so as to acquire the correct region feature of the surveillance region; further, one predefined time cycle can be set, and the present invention can continuously collect the track information in the predefined time cycle and then analyze the collected track information again when the predefined time cycle is expired, so as to regularly detect whether the region feature of the surveillance region is changed, for determining whether to update the entrance and/or the shape of the surveillance region. Comparing to the prior art, the surveillance region identifying method and the related surveillance apparatus of the present invention do no need manual drawing of the region of interest (ROI). The present invention can collect the motion behavior and the moving trace of large numbers of the objects for selecting the effective track information, and automatically compute the correct entrance and the correct shape of the surveillance region in accordance with the effective track information, so as to provide advantages of inexpensive cost, convenient operation and an automatic updating function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surveillance region identifying method of analyzing a region feature of a surveillance region covered by a surveillance apparatus, the surveillance region identifying method comprising:
   analyzing all track information within a series of surveillance images acquired by the surveillance apparatus to acquire an appearing point and a disappearing point of each track information;
   utilizing cluster analysis to define a main appearing point cluster of appearing points of all the track information;
   computing enter vectors of a plurality of appearing points inside the main appearing point cluster; and
   analyzing vector angles of a plurality of enter vectors of the main appearing point cluster to define an entrance of the surveillance region in accordance with an analysis result;
   utilizing a main disappearing point cluster and a disappeared vector related to the disappearing point to define another entrance of the track information; and
   comparing the entrance defined by the enter vectors with the another entrance defined by the disappeared vector for deciding whether a correct entrance is identified.

2. The surveillance region identifying method of claim 1, wherein define the entrance of the surveillance region in accordance with the analysis result comprises:
   comparing the vector angles of the plurality of enter vectors respectively with a predefined angle condition; and
   utilizing several appearing points that corresponds to several enter vectors with the vector angles conforming to the predefined angle condition to define the entrance.

3. The surveillance region identifying method of claim 1, wherein define the entrance of the surveillance region in accordance with the analysis result comprises:
   computing a geometric center and a related geometric pattern of the plurality of appearing points; and
   defining a boundary of the entrance via the geometric pattern.

4. The surveillance region identifying method of claim 1, further comprising:
   defining a grid map by the series of surveillance images, wherein a range of the grid map corresponds to the series of surveillance images;
   computing a passing number of the track information passing through each grid on the grid map;
   determining whether the passing number of each grid exceeds a predefined number threshold; and
   utilizing some grids that have the passing number exceeding the predefined number threshold to set a regional shape of the surveillance region.

5. The surveillance region identifying method of claim 1, further comprising:
   acquiring a continued period of each of the track information; and
   utilizing some appearing points of some track information that has the continued period greater than a predefined time threshold to execute the cluster analysis.

6. The surveillance region identifying method of claim 1, wherein the surveillance region identifying method acquires position change of the appearing point of each track information after a predefined time period, and utilizes the appearing point and the position change to generate an enter vector relevant to the appearing point.

7. The surveillance region identifying method of claim 6, further comprising:
   determining whether a vector length of each of the enter vectors exceeds a predefined length threshold; and
   selecting some enter vectors that have a vector length exceeding the predefined length threshold to execute analysis of the vector angles of the selected enter vectors.

8. The surveillance region identifying method of claim 1, further comprising:
   determining whether a moving object within the series of surveillance images conforms to a predefined identification condition; and
   defining an immediate coordinates of the moving object within the series of surveillance images as the appearing point of the track information relevant to the moving object when the moving object within the series of surveillance images conforms to the predefined identification condition.

9. The surveillance region identifying method of claim 1, wherein the surveillance region identifying method collects the track information during a predefined time cycle, and analyzes the collected track information in response to the predefined time cycle being expired, so as to detect whether the entrance of the surveillance region is changed.

10. A surveillance apparatus, comprising:
    an image receiver adapted to receive a series of surveillance images; and an operation processor electrically connected to the image receiver, the operation processor being adapted to analyze all track information within the series of surveillance images acquired by the surveillance apparatus to acquire an appearing point and a disappearing point of each track information, utilize cluster analysis to define a main appearing point cluster of appearing points of all the track information, compute enter vectors of a plurality of appearing points inside the main appearing point cluster, analyze vector angles of a plurality of enter vectors of the main appearing point cluster to define an entrance of a surveillance region covered by the surveillance apparatus in accordance with an analysis result, utilizing a main disappearing point cluster and a disappeared vector related to the disappearing point to define another entrance of the track information, and comparing the entrance defined by the enter vectors with the another entrance defined by the disappeared vector for deciding whether a correct entrance is identified.

11. The surveillance apparatus of claim 10, wherein the operation processor is further adapted to compare the vector angles of the plurality of enter vectors respectively with a predefined angle condition, and utilize several appearing points that corresponds to several enter vectors with the vector angles conforming to the predefined angle condition to define the entrance.

12. The surveillance apparatus of claim 10, wherein the operation processor is further adapted to compute a geometric center and a related geometric pattern of the plurality of appearing points, and define a boundary of the entrance via the geometric pattern.

13. The surveillance apparatus of claim 10, wherein the operation processor is further adapted to define a grid map by the series of surveillance images, compute a passing number of the track information passing through each grid on the grid map, determine whether the passing number of each grid exceeds a predefined number threshold, and utilize some grids that have the passing number exceeding the predefined number threshold to set a regional shape of the surveillance region, wherein a range of the grid map corresponds to the series of surveillance images.

14. The surveillance apparatus of claim 10, wherein the operation processor is further adapted to acquire a continued period of each of the track information, and utilize some appearing points of some track information that has the continued period greater than a predefined time threshold to execute the cluster analysis.

15. The surveillance apparatus of claim 10, wherein the operation processor is further adapted to acquire position change of the appearing point of each track information after a predefined time period, and utilize the appearing point and the position change to generate a enter vector relevant to the appearing point.

16. The surveillance apparatus of claim 15, wherein the operation processor is further adapted to determine whether a vector length of each of the enter vectors exceeds a predefined length threshold, and select some enter vectors that have a vector length exceeding the predefined length threshold to execute analysis of the vector angles of the selected enter vectors.

17. The surveillance apparatus of claim 10, wherein the operation processor is further adapted to determine whether a moving object within the series of surveillance images conforms to a predefined identification condition, and define an immediate coordinates of the moving object within the series of surveillance images as the appearing point of the track information relevant to the moving object when the moving object within the series of surveillance images conforms to the predefined identification condition.

18. The surveillance apparatus of claim 10, wherein the operation processor is further adapted to collect the track information during a predefined time cycle, and analyze the collected track information in response to the predefined time cycle being expired, so as to detect whether the entrance of the surveillance region is changed.

* * * * *